United States Patent
Mihara

(10) Patent No.: US 10,188,028 B2
(45) Date of Patent: Jan. 29, 2019

(54) PLANTING APPARATUS OF NURSERY TREES AND PLANTING VEHICLE OF NURSERY TREES

(71) Applicant: Makoto Mihara, Tokyo (JP)

(72) Inventor: Makoto Mihara, Tokyo (JP)

(*) Notice: Subject to any disclaimer, the term of this patent is extended or adjusted under 35 U.S.C. 154(b) by 0 days.

(21) Appl. No.: 15/567,131

(22) PCT Filed: Apr. 19, 2016

(86) PCT No.: PCT/JP2016/062305
§ 371 (c)(1),
(2) Date: Oct. 17, 2017

(87) PCT Pub. No.: WO2016/171111
PCT Pub. Date: Oct. 27, 2016

(65) Prior Publication Data
US 2018/0160616 A1 Jun. 14, 2018

(30) Foreign Application Priority Data

Apr. 20, 2015 (JP) .................................. 2015-085731

(51) Int. Cl.
| | | |
|---|---|---|
| *A01C 11/02* | (2006.01) | |
| *A01C 11/00* | (2006.01) | |
| *A01G 23/04* | (2006.01) | |
| *A01C 5/04* | (2006.01) | |
| *B66F 9/12* | (2006.01) | |

(52) U.S. Cl.
CPC ................ *A01C 11/02* (2013.01); *A01C 5/04* (2013.01); *A01C 11/00* (2013.01); *A01G 23/04* (2013.01); *B66F 9/12* (2013.01)

(58) Field of Classification Search
CPC ......... A01C 11/00; A01C 11/02; A01C 13/00; A01G 23/02; A01G 23/04; A01G 23/043; A01G 23/046
See application file for complete search history.

(56) References Cited

U.S. PATENT DOCUMENTS 3,566,814 A * 3/1971 Pelton .................... A01C 5/02
111/99

FOREIGN PATENT DOCUMENTS

| JP | S53-138840 A | 12/1978 |
|---|---|---|
| JP | H9-201136 A | 8/1997 |

(Continued)

OTHER PUBLICATIONS

International Search Report for corresponding International Application No. PCT/JP2016/062305 dated Jul. 12, 2016.

*Primary Examiner* — Alicia Torres
(74) *Attorney, Agent, or Firm* — Renner Otto Boisselle & Sklar, LLP

(57) ABSTRACT

A planting apparatus of nursery tree includes an auger, a guide member having a hollow tube shape, a blade member, sliders, and motors The auger, the guide member and the blade member form the nested structure of the three-layer which are centered upon the auger, and the auger and the blade member are rotation members rotating on the same vertical axis line. By such a constitution, desired planting hole can easily be excavated, and the ground around the excavated hole and a root clump of the nursery tree can be leveled, covered and pressed by the blade member without forming a gap while holding the nursery tree by the guide member not to be inclined.

10 Claims, 16 Drawing Sheets

(56) References Cited

FOREIGN PATENT DOCUMENTS

| JP | 2004-33152 A | 2/2004 |
|---|---|---|
| JP | 2007-6715 A | 1/2007 |

\* cited by examiner (a)

(b)

(a)

(b)

(a)    (b)

PLANTING APPARATUS OF NURSERY TREES AND PLANTING VEHICLE OF NURSERY TREES

TECHNICAL FIELD

Due to aging of workforce in agriculture or forestry, there is a strong need for mechanizing the planting work of seeding and nursery tree (hereinafter abbreviated as "nursery tree") which is conventionally performed by manpower. In particular, although felling time of broad scale artificial forests after World War II, has come, a number of no replanting and standing forests has been increasing due to shortage of workers and high replanting cost.

In addition, extensive industrial afforestation or environmental afforestation constrains harsh works under a severe condition. In order to increase the survival ratio of the planted nursery trees, it is required to plant the nursery trees intensively in a short time period just before rainy season. According to kinds of trees, it is necessary to deeply cultivate and plant to prevent desiccation or in search of underground water vein. Thus, it is desired to realize an automatic planting apparatus which enables to continuous plating works by a few operators in short time period.

BACKGROUND ART

A conventional planting apparatus of nursery trees shown in JP-S53-138840A (Patent document 1) comprises a guide tube for guiding a nursery tree, an openable element which has a cone shape divided into two pieces and disposed below the guide tube, plates for covering soil which are disposed on both sides of the divided pieces of the openable element. The openable element is stuck into the ground and opened. Subsequently, a nursery tree in the guide tube is dropped into the ground, and the mound of soil is covered by the plates for covering soil.

Another conventional planting apparatus shown in JP-H9-201136A (Patent document 2) comprises a rotation tube, a guide tube which is slidably provided in the rotation tube, an auger which is provided on lower end of the guide tube and openably divided in two parts, and leveling and pressing plate provided on an outer periphery of the rotation tube. The rotation tube, the guide tube and the auger are pushed down while rotating the auger so as to excavate a planting hole on the ground. After pulling up the guide tube and the auger, the auger is opened and a nursery tree is dropped into the planting hole via the guide tube. After pulling up the guide tube and the auger furthermore, the mound of soil around the nursery tree is pressed by the pressing plate.

Still another conventional planting apparatus shown in JP2007-6715A (Patent document 3) comprises a pair of augers each having a cutting bar and moved down while rotating, and a planting tube which is moved up and down and has an openable shutter at lower end thereof. The ground is excavated by rotation of the augers, the planting tube is stuck into the ground, the shutter at a lower of the planting tube is opened, nursery tree is fed, the planting tube is pulled up, and the soil is leveled and pressed by the cutting bars of the augers.

Still another conventional planting apparatus shown in JP2004-33152A (Patent document 4) comprises an auger, a wall protection tube coaxially provided with the auger and a clamp arm which is disposed outward from the tube for clamping a nursery tree. A planting hole is excavated by the auger and simultaneously the tube is pushed into the planting hole. A nursery tree is fed into the tube by rotation of the clamp arm after pulling up the auger, dropped into the excavated hole, and covered with the soil by rotation of the clamp arm after pulling up the tube.

DISCLOSURE OF INVENTION

Problems to Solve the Invention

However, in the apparatus shown in the Patent document 1, since the mound of soil is covered from both sides of the opened pieces of the openable element, it is difficult to level, to cover and to press the periphery all around the nursery tree evenly. In the apparatus shown in the Patent document 2, the dividing mechanism of the auger and the supporting structure of the leveling and pressing plate become complex. In the apparatus shown in the Patent document 3, the constitution of the apparatus becomes complex because of using the tube having the openable shutter and leveling and pressing the soil by the cutting bars of the augers.

In the apparatus shown in the Patent document 4, covering of soil is performed by rotation of the clamp arm which is rotated by a swing mechanism provided out of the center of the planting hole, so that the constitution of the apparatus becomes complex.

In addition, the above mentioned constitution to drop the nursery tree into the excavated hole through the hollow tube has a disadvantage that the nursery tree may be blocked in the midway of the tube, if the branch of the nursery tree is widely spread relative to the size of the root clump, so that workability may be decreased. In order to solve such a problem, when a tube having a bigger diameter than that of the root clump is used to plant the nursery tree, a gap between the root clump of the nursery tree and the excavated hole occurs tree and causes low survival ratio of the planted nursery tree, so that it is necessary to perform the covering and pressing of soil properly to fill the gap. However, anyone of the prior arts disclosed in the Patent documents has no constitution which enables to perform the covering of soil all around the nursery tree properly. Consequently, the nursery trees which can be planted by the conventional planting apparatuses are limited to ones satisfying both conditions of 1) the diameter of the root clump is substantially the same as that of the planting hole so that no gap occurs between the root clump and the planting hole, and 2) the branch spread is within a size not to be blocked in the hollow tube.

Generally, the nursery trees are products of nature, so that individual differences occur among the branch spreads of the nursery trees even in the same seeding period. In addition, it is necessary to plant nursery trees among which differences of growths occur due to planting time (seeding term) for year-round planting. The above mentioned prior arts cannot respond to such multiple planting of the nursery trees.

A purpose of the present invention is to respond to the above-mentioned problem and to provide a planting apparatus of nursery trees having a simple constitution which enables to plant the nursery trees having various sizes with a predetermined specification, and to perform leveling, covering, and pressing the soil properly after planting the nursery tree, and further to provide a planting vehicle of nursery trees which can pick up a nursery tree one by one among a lot of nursery trees and put into a planting hole precisely and simply.

Means to Solve the Problems

A planting apparatus of nursery trees in accordance with the present invention comprises:

an auger for excavating a planting hole on a ground;

a guide member having a hollow cylindrical tube shape for putting a nursery tree into the planting hole;

a blade member for leveling, covering and pressing soil around the nursery tree which has been put into the planting hole;

a lifting means for moving the auger, the guide member and the blade up and down in a same vertical axis line direction; and a rotation means for rotating the auger and the blade, wherein the auger, the guide member and the blade member form the nested structure of the three-layer which are centered upon the auger, and serve as rotation members rotating on the same vertical axis line or a rotation bearing.

In addition, a planting vehicle of nursery trees in accordance with the present invention comprises the above planting apparatus, and wherein the vehicle further comprises: a platform on which nursery trees are loaded; and a conveying means for conveying and putting a nursery tree loaded on the platform into an upper end opening of the guide member.

Effects of the Invention

According to the present invention, (1) since the planting apparatus has a simple constitution that the auger, the guide member and the blade member are independently moved up and down and the blade member is coaxially provided at the outer periphery of the guide member, in order to excavate a planting hole, the guide member can easily be inserted into an excavated hole after discharging the soil in a primary excavation by the auger. Therefore, the soil which is generated due to ruin of wall of the excavated hole after the primary excavation can be removed by rotation pumping of the auger through the guide member in a secondary excavation. Accordingly, it is possible to excavate a planting hole having desired depth and diameter by a lower driving force without compressing the peripheral wall of the excavated hole. In addition, various planting such as planting of a large sized nursery tree, industrial afforestation or environmental afforestation in desert or wasteland of soil with sand gravel, and planting nursery tree deeply into the ground other than 2 or 3 years seeding which is general in forestry, can be performed suitably.

(2) Since only the root of a nursery tree can be opened by pulling up the guide member near to the ground after putting the nursery tree into the excavated hole through the guide member, it is possible to level, to cover and to press the soil around the excavated hole and the root clump of the nursery tree by the blade member while holding the branches and leaves of the nursery tree so as not to slant the nursery tree. Consequently, it is possible to improve the survival ratio of the planted nursery tree due to aridity of the root clump of the nursery tree.

(3) Constitutionally, it is possible to use a guide member and a blade member each having bigger diameter than that of the root clump of the nursery tree so as to prevent block up of the nursery tree in the guide member. In addition, it is possible to excavate a planting hole having a diameter larger than that of the root clump and to cultivate the ground around the nursery tree deeply. Consequently, roots of weeds around the nursery tree can be cut out so that it is possible to prevent growth failure of the nursery tree due to weeds.

BRIEF DESCRIPTION OF DRAWINGS

FIG. 2B is a front view of the planting vehicle.

FIG. 2(a) and FIG. 2(b) are perspective views showing a part of a handling robot for nursery tree provided on the planting vehicle.

FIG. 8(a) is a sectional view when a small blade is pushed into the blade member, and FIG. 8(b) is a sectional view when the small blade pushed out from the blade member.

FIG. 10(a) shows a situation before the planting operation, FIG. 10(b) shows a situation of a primary excavation where the auger is moved down, FIG. 10(c) shows a situation of a secondary excavation where the guide member is moved down into a excavated hole, FIG. 10(d) shows a situation where the auger is moved up and a nursery tree is put into the excavated hole, FIG. 10(e) shows a situation where the guide member is moved up and the blade is moved down and rotated FIG. 10(f) shows a situation where the planting operation is completed and the guide member and the blade are moved up.

MODE FOR CARRYING OUT THE INVENTION

Figure 1A:
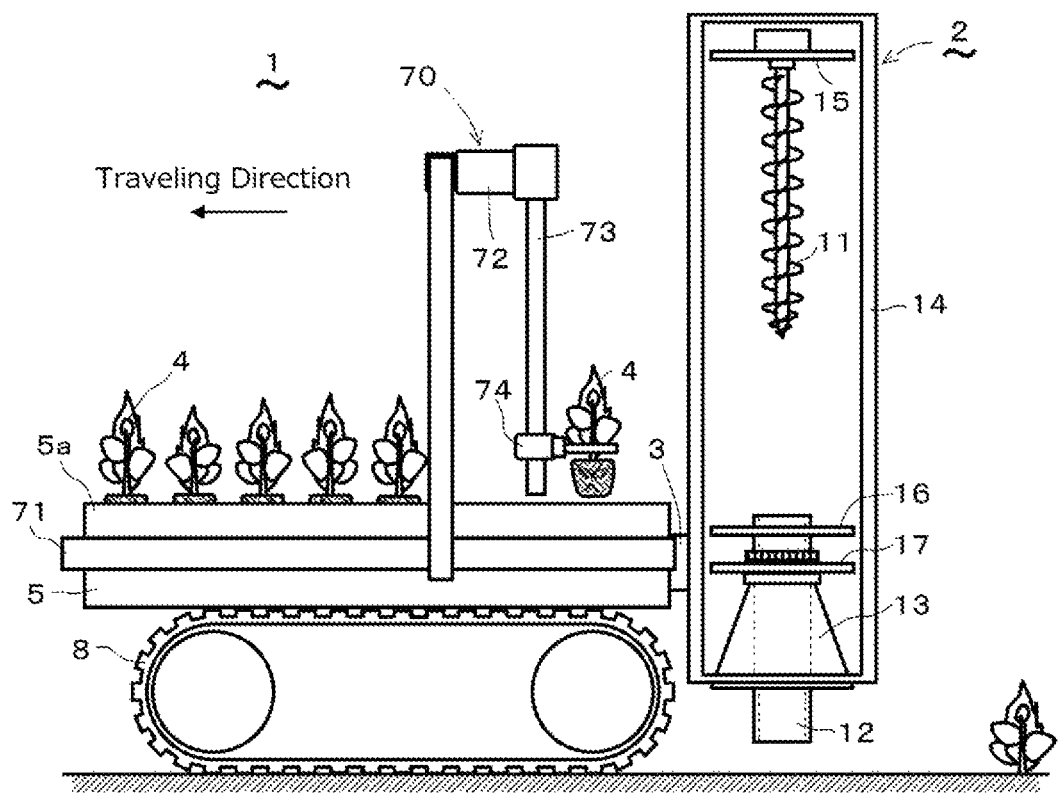
FIG. 1A is a side view showing a planting vehicle of nursery trees in accordance with an embodiment of the present invention.
Figure 1B:
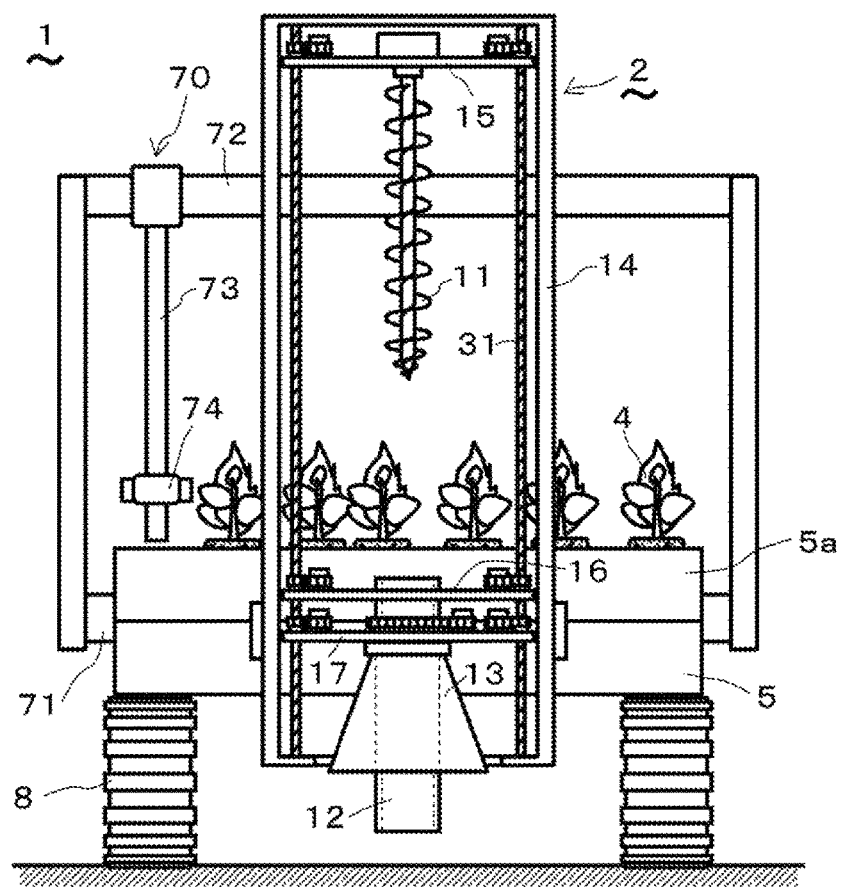
FIG. 1C is a perspective view of the planting vehicle except a frame of a planting apparatus.
Figure 1C:
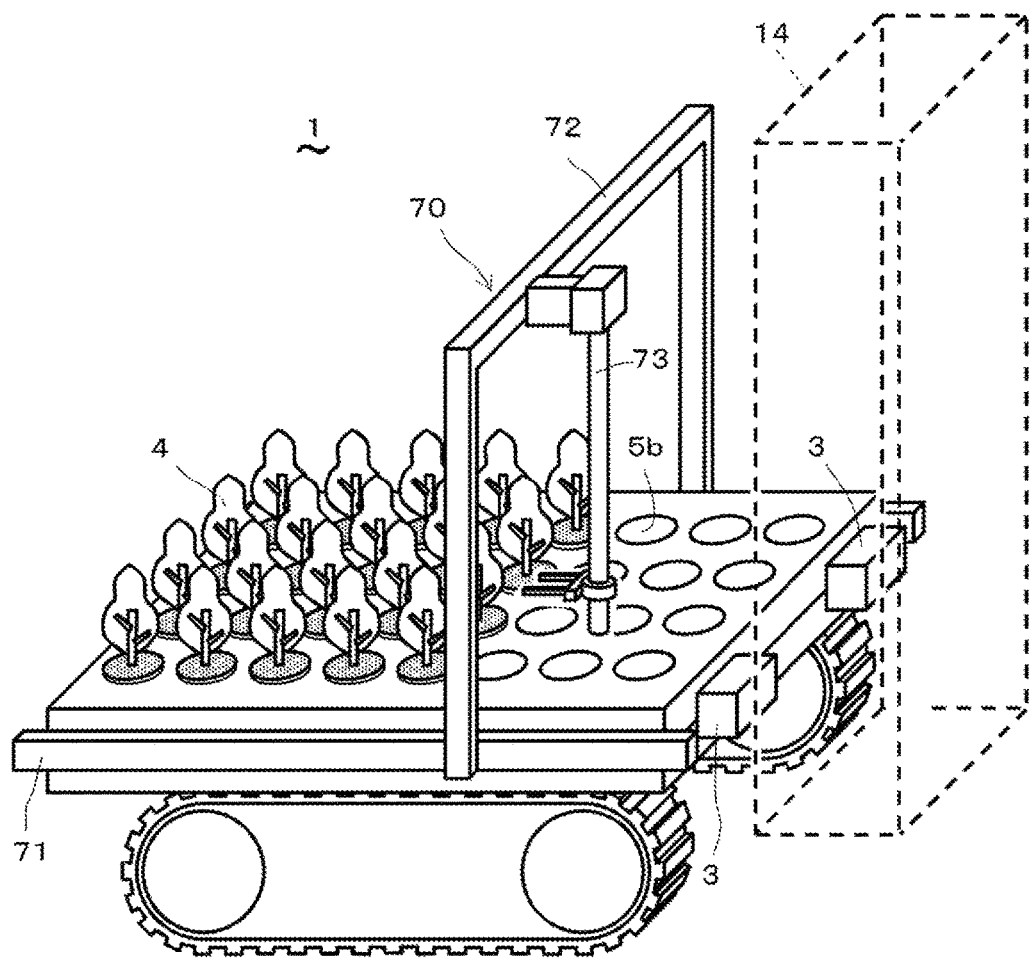

FIGS. 1A, 1B and 1C respectively show a planting vehicle of nursery trees 1 in accordance with an embodiment of the present invention. The planting vehicle of nursery trees 1 (hereinafter, abbreviated as planting vehicle) comprises a planting apparatus of nursery trees 2 (hereinafter, abbreviated as planting apparatus). The planting vehicle 1 comprises a platform 5 with a cradle 5a on which nursery trees 4 are loaded at predetermined intervals, and a handling robot (conveying means) 70 which is movable on the platform 5. Although the planting vehicle 1 is traveled by crawlers 8 which are driven by an engine or the like, it may be traveled by wheels or legged locomotion. Traveling direction of the planting vehicle 1 is generally in left hand in FIG. 1A. The planting apparatus 2 comprises a machine frame 14 on which main components used for planting such as an auger 11, a guide member 12 and a blade member 13 are mounted, and the machine frame 14 is mounted on the platform 5 via an automatic horizontal maintainer 3. The auger 11, the guide member 12 and the blade member 13 are respectively supported on sliders 15, 16 and 17 which can move up and down. As for the automatic horizontal maintainer 3, the apparatus having a model number ALK-MK3 provided by ACE•SYSTEM Corporation (Sapporo, Hokkaido, Japan) can be used, and the automatic horizontal maintainer 3 enables to maintain the machine frame 14 in vertical direction and to plant the nursery tree 4 independent from inclination of the planting vehicle 1. Alternatively, the machine frame 14 may be directly mounted on the planting vehicle 1 without using the automatic horizontal maintainer 3.

The cradle 5a has a plurality of storage holes 5b into which root clumps of the nursery trees 4 are contained. The storage holes 5b are provided at a regular interval on the cradle 5a. Alternatively, a constitution that a plurality of multi-cavity containers for growing seeding is mounted in a predetermined arrangement on the platform 5 may be used instead of using the cradle 5a. In such a case, it is desirable to decrease adhesion between the root clumps of the nursery trees and the storage holes of the containers previously by manpower or using a commercial machine for pulling the seeding from the containers (products of SANTECHNO CORPORATION, Kami City, Kochi, Japan) so as to pull the seeding by the handling robot easily.

The handling robot 70 is used for conveying a nursery tree 4 arranged on the cradle 5a to the planting apparatus 2, and comprises a robot hand 74 and an XYZ-axes moving means. The robot hand 74 can move in XYZ-axes directions on the cradle 5a so as to grab a stein of the nursery tree 4, to carry and to put the nursery tree 4 to above and into an upper opening of the guide member 12 in the machine frame 14. The XYZ-axes moving means comprises an X-axis slide rail 71, a Y-axis slide rail 72 and a Z-axis slide rail 73. As for the XYZ-axes moving means, various types of commercial electric actuators can be used.

Figure 2:
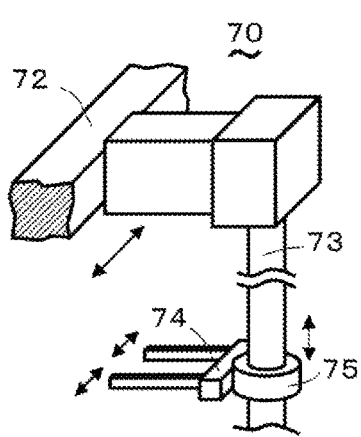
Figure 2:
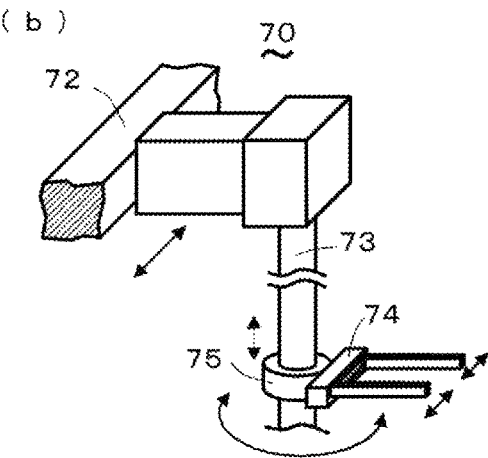

FIGS. 2(a) and 2(b) show the handling robot 70. The robot hand 74 having a built-in controller is mounted on the Z-axis slide rail 73. The robot hand 74 has two fingers of a fork which are mounted on a rotation unit 75 and parallel to the cradle 5a which can grab the nursery tree 4 horizontally from a side of the planting apparatus and rotate 180 degrees. It is desirable to attach a shock-absorbing material such as a foam rubber on an inner opposing faces of the robot hand 74 so as not to damage the nursery tree. If it is constituted that a plurality of robot hands 74 is arranged on the X-axis, and the same number of planting mechanisms are arranged and driven concurrently, multiple planting can be performed simultaneously.

Figure 3:
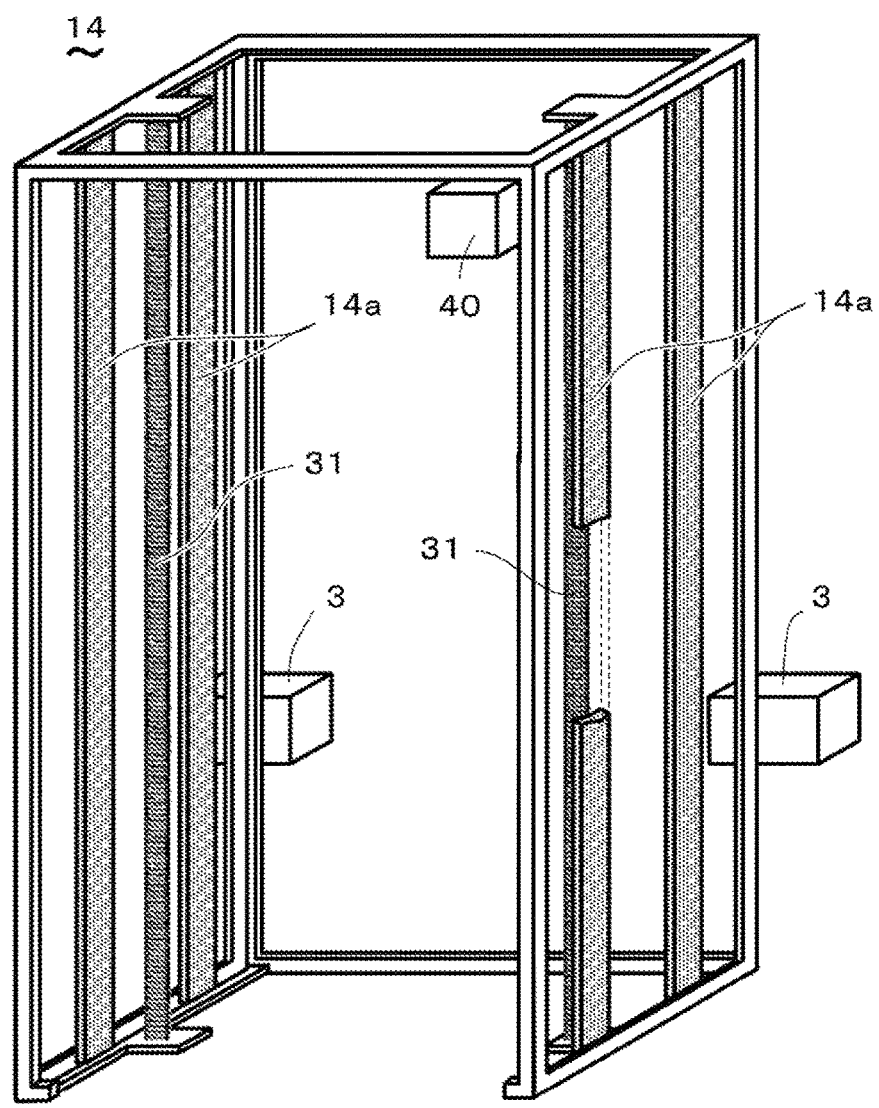
FIG. 3 is a perspective view of a machine frame of the planting apparatus of nursery trees in accordance with an embodiment of the present invention.

FIG. 3 shows the machine frame 14 of the planting apparatus 2. The machine frame 14 is a frame body made of steel or the like and opened at least a rear bottom portion against the traveling direction of the planting vehicle 1, and mounted on the planting vehicle 2 via the automatic horizontal maintainer 3. The machine frame 14 comprises rails 14a for guiding movements of the sliders 15, 16 and 17 up and down in vertical axis line direction, and ball screw shafts 31 which serve as common axes for the auger, the guide member and the blade member. The rails 14a are provided on both of left and right side faces of the machine frame 14 in vertical direction. The ball screw shafts 31 are provided on both of left and right side faces of the machine frame 14 in vertical direction and upper and lower ends thereof are fixed on the machine frame 14. A control apparatus (control means) 40 for controlling the motions of the planting apparatus 2 is provided on the machine frame 14. Details of the motion will be described later.

Figure 4:
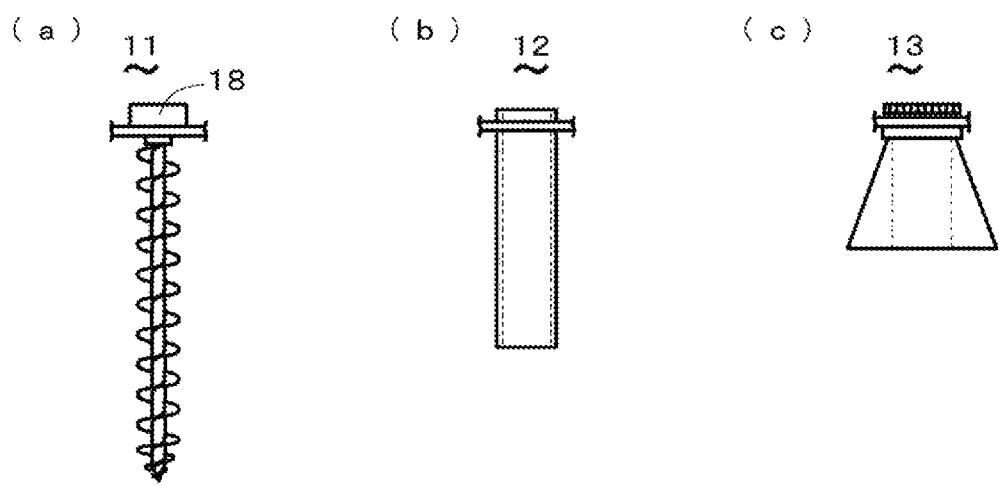
FIG. 4(a) is a side view of an auger provided in the planting apparatus of nursery trees.
FIG. 4(b) is a side view of a guide member provided in the planting apparatus of nursery trees.
FIG. 4(c) is a side view of a blade member provided in the planting apparatus of nursery trees.

FIGS. 4(a), 4(b) and 4(c) respectively show the auger 11, the guide member 12 and the blade member 13 which are main components of the planting apparatus 2. The auger 11 is used to excavate a planting hole on the ground by rotation thereof. The auger 11 is a drill blade having a screw shape and driven to rotate by a motor 18. The auger 11 discharges by its screw the excavated soil to the surface of the ground directly in a primary excavation, and discharges the soil from the upper opening of the guide member 12 which is inserted around the outside of the auger 11 in a secondary excavation. Alternatively, a hammer drill with built-in motor may be used instead of the auger 11 and the motor 18, and, in such a case, high speed excavation can be performed even when the soil contains gravel.

The guide member 12 has a hollow cylindrical tube shape so as to put a nursery tree into the planting hole, and constituted to be moved up and down. In this embodiment, the guide member 12 is constituted not to be rotated, however, it may be constituted to be rotated. In case of the constitution to rotate the guide member 12, a coupling unit such as a slit gear for providing the blade member 13 on a top end of an outer surface of the guide member 12 is formed, so that rotation of the blade member 13 is transmitted to the guide member 12 to be rotated with each other. Consequently, no driving source for rotating the guide member 12 is needed.

Figure 5:
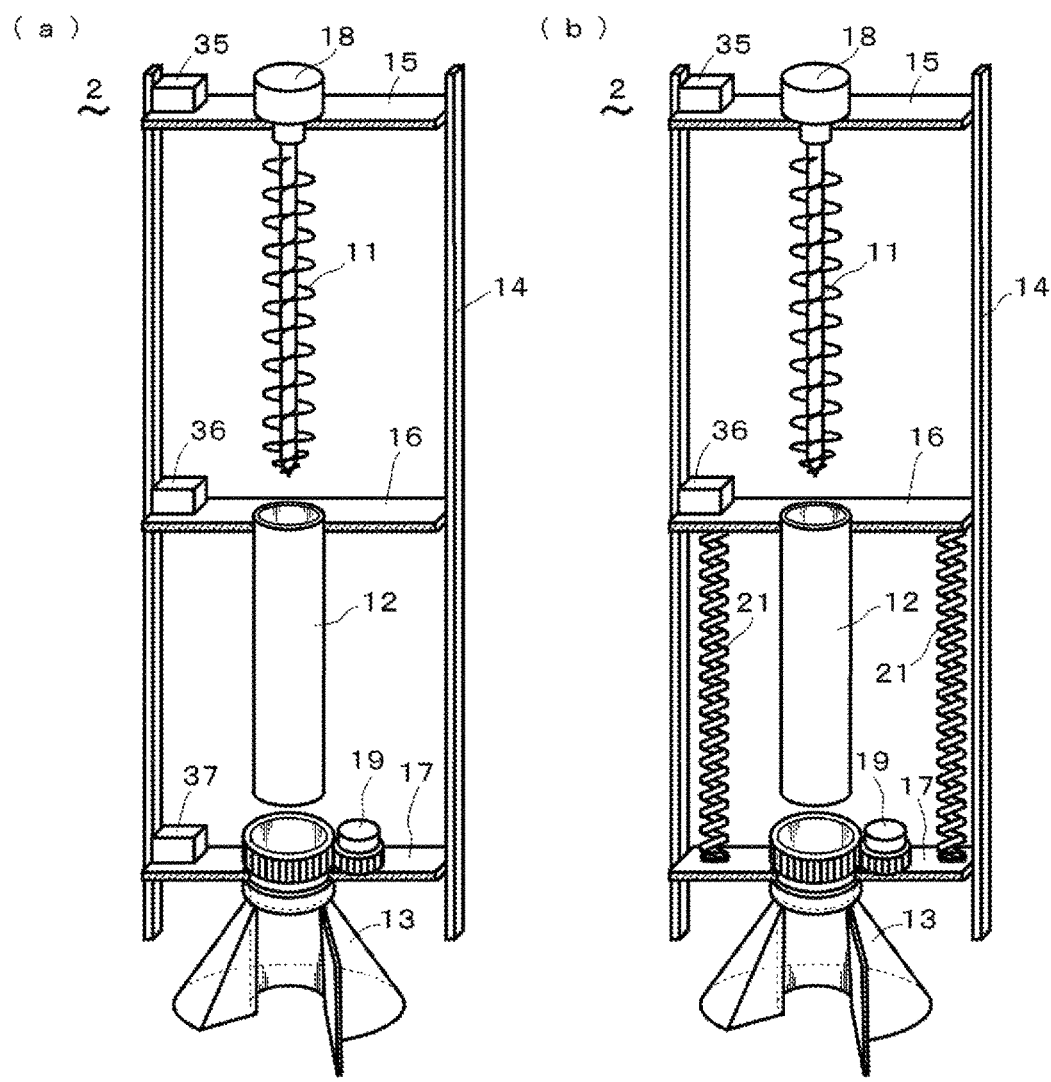
FIG. 5(a) is a perspective view showing a first constitutional example of the planting apparatus of nursery trees.
FIG. 5(b) is a perspective view showing a second constitutional example thereof.

The blade member 13 is constituted to level, to cover and to press the soil around a nursery tree put into a excavated hole. The blade member 13 has a frustum of circular cone shape that the lower end thereof is spread like skirt, and is inserted around the outside of the guide member 12 and movable in axial direction thereof, so that the blade member 13 is rotated around the guide member 12 serving as a rotation bearing by rotation of the rotation driving motor 19 (see FIG. 5). Since a height of the blade member 13 is shorter than that of the guide member 12, when the blade member 13 is moved upward to upper limit to the guide member 12, a lower end of the guide member 12 protrudes from the lower end of the blade member 13. Thereby, the lower end of the guide member 12 can enter into underground in the excavation of the ground by the auger 11.

FIG. 5(a) shows a first constitutional example of the planting apparatus 2. The planting apparatus 2 comprises the sliders 15, 16 and 17 which are moved up and down in vertical axis line direction along rails of the machine frame 14. The auger 11, the guide member 12 and the blade member 13 are respectively supported on the sliders 15, 16 and 17. The auger 11, the guide member 12 and the blade member 13 form a nested structure of the three-layer which are centered upon the auger 11 and the blade member 13 is disposed on the outermost layer. The auger 11 and the blade member 13 are the rotation members each rotating on the same vertical axis and the guide member 12 serves as a rotation bearing of the blade member. The slider 15, 16 and 17 respectively comprise lifting driving sources 35, 36 and 37. As for the lifting driving sources 35, 36 and 37, electric motors, hydraulic motors, and so on (not shown) can be used, and driving forces of the motors are transmitted to move the sliders up and down respectively via gears or pulleys.

The sliders 15, 16 and 17 and the lifting driving sources 35, 36 and 37 constitute a lifting means for moving the auger 11, the guide member 12 and the blade member 13 up and down on the same vertical axis. The auger 11 and the blade member 13 respectively have the motors 18 and 19 as rotation means to be rotated. By using the above mentioned sliders 15, 16 and 17, it is easy to form the auger 11, the guide member 12 and the blade member 13 as the nested structure of the three-layer and to rotate the rotation members on the same vertical axis or to serve as the rotation bearing. In addition, the lifting means is not limited to the above mentioned constitution, and optional driving mechanisms, such as ball bushing, ball spline, rack and pinion, and so on may be used.

FIG. 5(b) shows a second constitutional example of the planting apparatus 2. In this example, instead of the motor as the driving source of the slider 17 compression coil springs 21 are provided between the slider 16 for the guide member 12 and the slider 17 for the blade member 13. According to such a constitution, it is no need to control the up and down movement of the slider 17 for the blade member 13, and enable to a passive control that the blade member 13 constantly contacts the ground or remained branch on the ground by pressure of the compression coil springs 21 when the slider 16 is below a certain position.

It is desirable that the planting apparatus 2 or the planting vehicle 1 comprising the same further comprises the control apparatus 40 (see FIG. 3) as a control means to control the motors of the lifting means, the rotation means, and so on. When servomotors are used as the driving sources, the control apparatus can control the moving distances of the sliders 15, 16 and 17 up and down, or the rotation numbers and the torques of the auger 11 and the blade member 13. The control apparatus controls in corporation with the automatic horizontal maintainer 3 and the robot hand 74 of the planting vehicle 1. In addition, aspect of the control is not limited to this example, and it may be optional.

Figure 6:
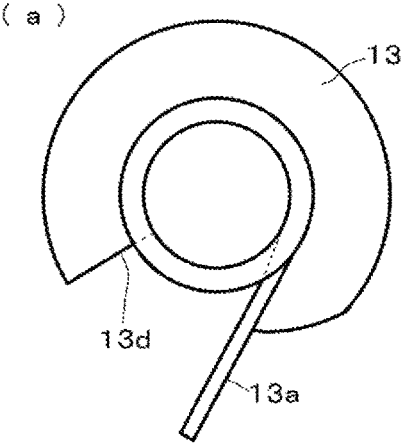
FIG. 6(a) is a plan view of the blade in the planting apparatus of nursery trees.
FIG. 6(b) is a perspective view thereof.
Figure 6:
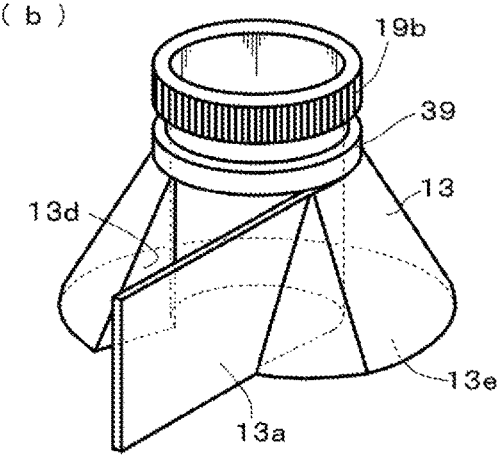

FIGS. 6(a) and 6(b) show a constitution example of the blade member 13. The blade member 13 has a cleavage 13d formed on a part of the frustum of circular cone shape, a flat bottom 13e and a protruded blade 13a. Since a bottom end of the cleavage 13d is extended to the hollow of the frustum circular cone, the soil around the blade member 13 is leveled and moved into the hollow by the rotation of the protruded blade 13a. The blade member 13 comprises a bearing 39 which is to be supported by the slider 17 in rotatable manner, and a gear 19b to be driven to rotate. Protruding direction, mounting height or position, or shape of the protruded blade 13a is optionally selective. According to the protruding direction, the mounting height, rotation speed of the blade member 13 and a moving distance in downward, degrees of leveling, pressing and so on of the soil can be varied.

Figure 7:
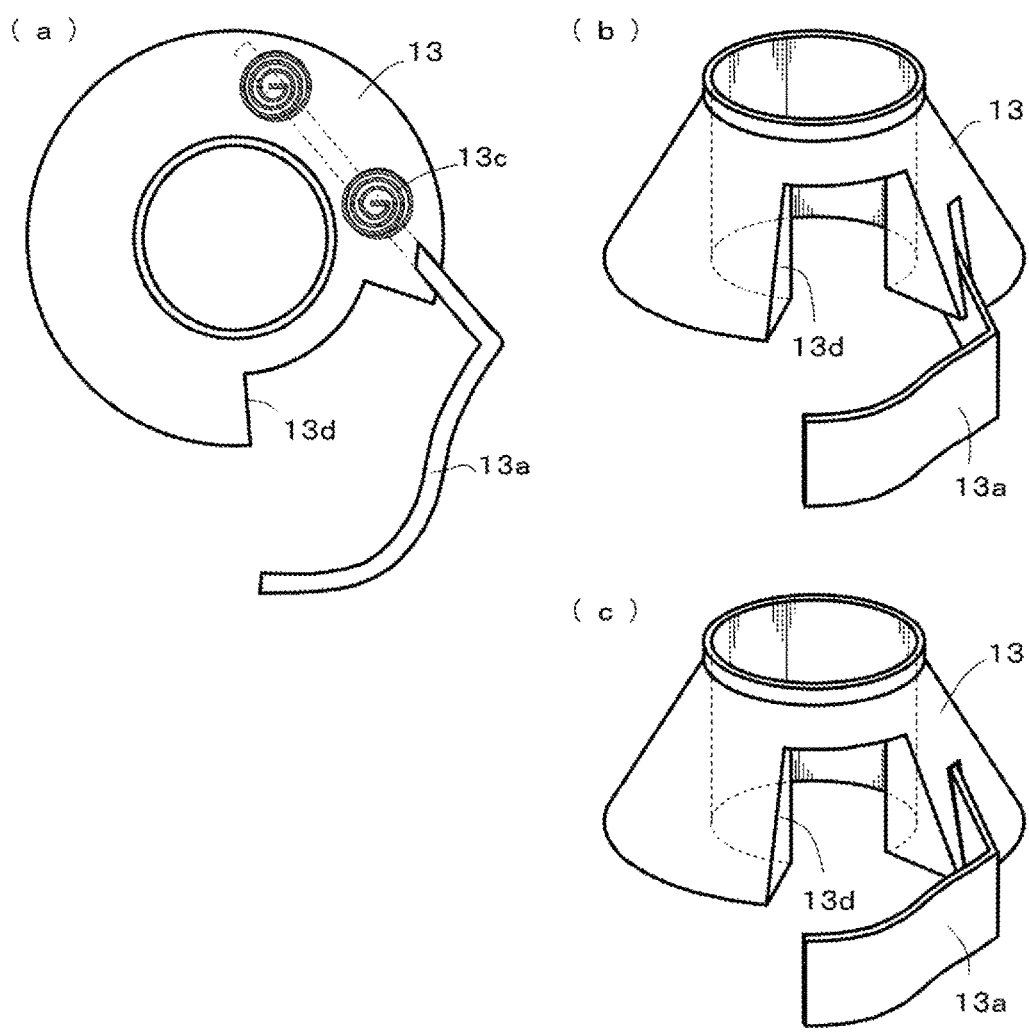
FIG. 7(a) is a plan view showing a modified example of the blade member of the planting apparatus of nursery trees.
FIG. 7(b) is a perspective view when an extension blade is protruded below the bottom of the blade member.
FIG. 7(c) is a perspective view when the extension blade is buried into the inside from the bottom of the blade member.

FIGS. 7(a), 7(b) and 7(c) respectively show a modified example of the blade member 13. The blade member 13 in this example has a frustum of circular cone shape with a cleavage 13d formed on a part thereof, and a protruded blade 13a is constituted that a front end of the protruded blade 13a is bent along an outer periphery of a skirt of the blade member 13, a lower end of the protruded blade 13a can be protruded below the bottom face of the blade member 13 by compression coil springs 13c provided in the blade member 13. According to such a constitution, the soil around the guide member 12 can be moved from below or around the blade member 13 to a gap between the nursery tree and the excavated hole by moving down and rotating the blade member 13. Furthermore, the compression coil springs 13 are gradually compressed responding to moving down of the blade member 13, and finally the protruded blade 13a is contained in the blade member 13 in vertical direction and the bottom end of the protruded blade 13a becomes the same level of the bottom of the blade member 13, so that the soil at contact portion between the blade member 13 and the ground can be pressed.

Figure 8:
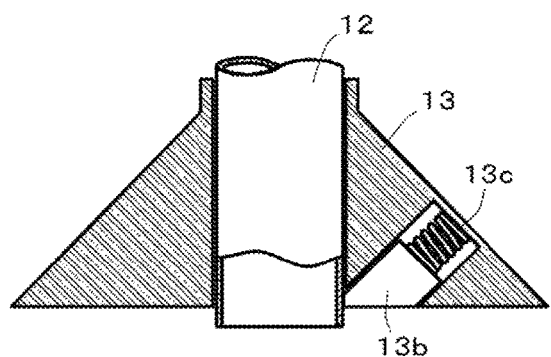
FIG. 8 shows another modified example of the blade member.
Figure 8:
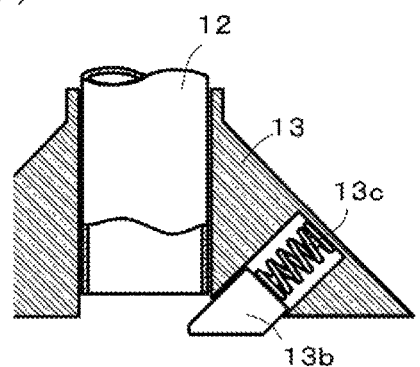
Figure 9:
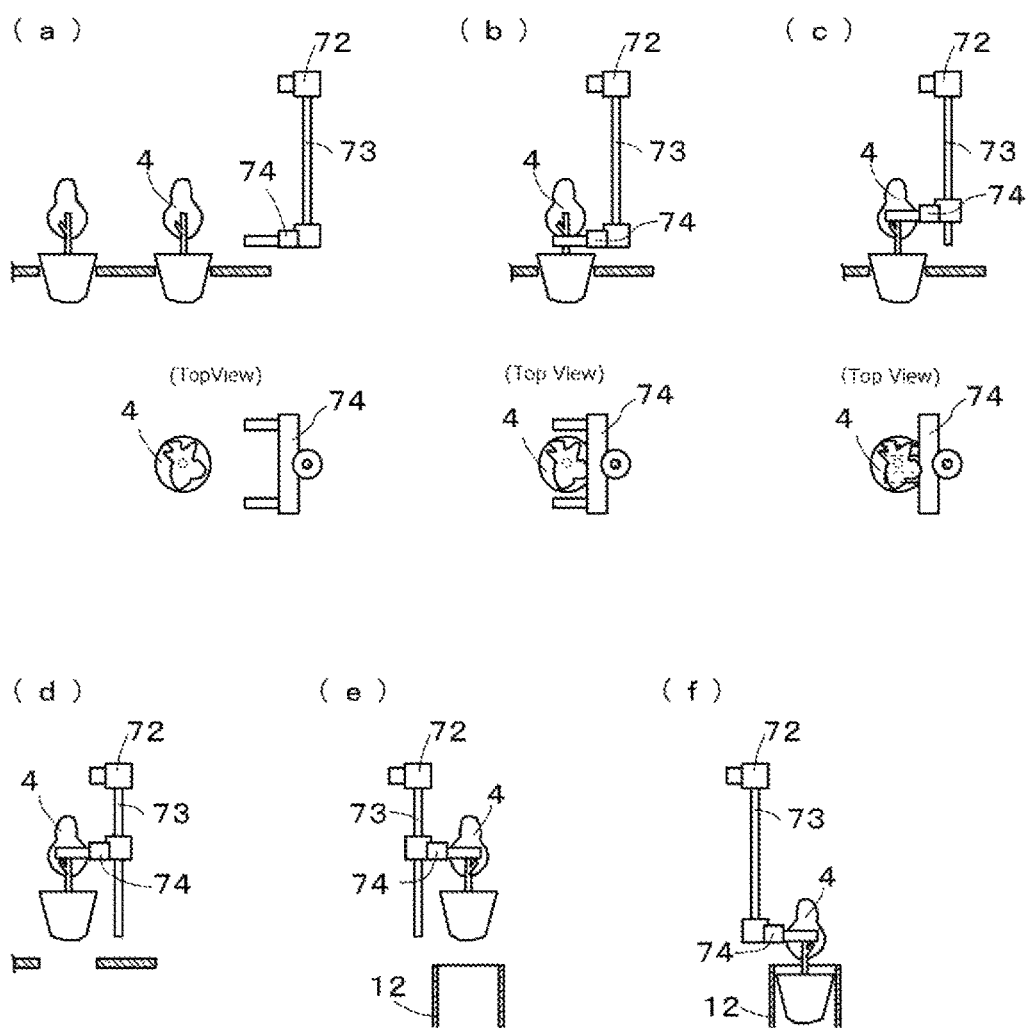
FIG. 9(a) to FIG. 9(f) are drawings showing motions of the handling robot in time-series.

FIGS. 8(a) and 8(b) respectively show another modified example of the blade member 13. The blade member 13 comprises one or a plurality of small blades 13b with a built-in compression coil spring 13c which are obliquely provided in an inside of and in the vicinity of the bottom of the blade member 13, and the small blades 13b can be moved in and out the inside of the blade member 13. In other words, the small blade 13b is pushed into the inside of the blade member 13 when the guide member 12 moves downward, and the small blade 13b is pushed out by the compression coil spring 13c when the guide member 12 moves upward. By using such a blade member 13, it is possible to control a length of inward protrusion of the small blade 13b by up and down movement of the guide member 12, to level, to cover and to press the soil up to an optional distance near the nursery tree in the hollow area of the guide member 12. Consequently, it is possible to move and fill the soil around the nursery tree to the base of the nursery tree, and to spread the leveled, covered and pressed area by the blade member up to the hollow area of the guide member 12.

Subsequently, a sequence of motions to put a nursery tree 4 into a hollow of the guide member 12 with using the robot hand 74 of the planting vehicle 1 is described referring to FIGS. 9(a) to 9(f). While spreading a distance between two fingers of the fork of the robot hand 74 to a diameter of the storage hole 5b for containing the nursery tree on the cradle 5a, the fork is horizontally moved toward the nursery tree 4 from a side of the planting apparatus at a constant height near to an upper face of the root clump of the nursery tree (see FIGS. 9(a) and 9(b)). While pulling up the fork upward, the distance between two fingers of the fork is narrowed to a predetermined distance so as to grasp the trunk and side branches (see FIG. 9(c)). While grasping the trunk and the side branches, the fork is lifted up so as to pull out the nursery tree from the storage hole (see FIG. 9(d)). The fork is horizontally rotated 180 degrees by the rotation unit 75, and moved to a position just above the upper opening of the guide member (see FIG. 9(e)). The fork is moved down to put the nursery tree 4 into the guide member 12, and the distance between the two fingers of the fork is widen to release the nursery tree 4 when the fork is lowered to a predetermined level, so that the nursery tree 4 falls into the guide member 12 (see FIG. 9(f)). Interference between the X-axis moving means of the fork and the machine frame 14 can be prevented by horizontal rotation of the fork. In addition, conveying method of the nursery tree is not limited to the above mentioned motions, another method can be adopted optionally.

Subsequently, the motion of the planting apparatus 2 is described referring to FIGS. 10(a) to 10(f).

Figure 10:
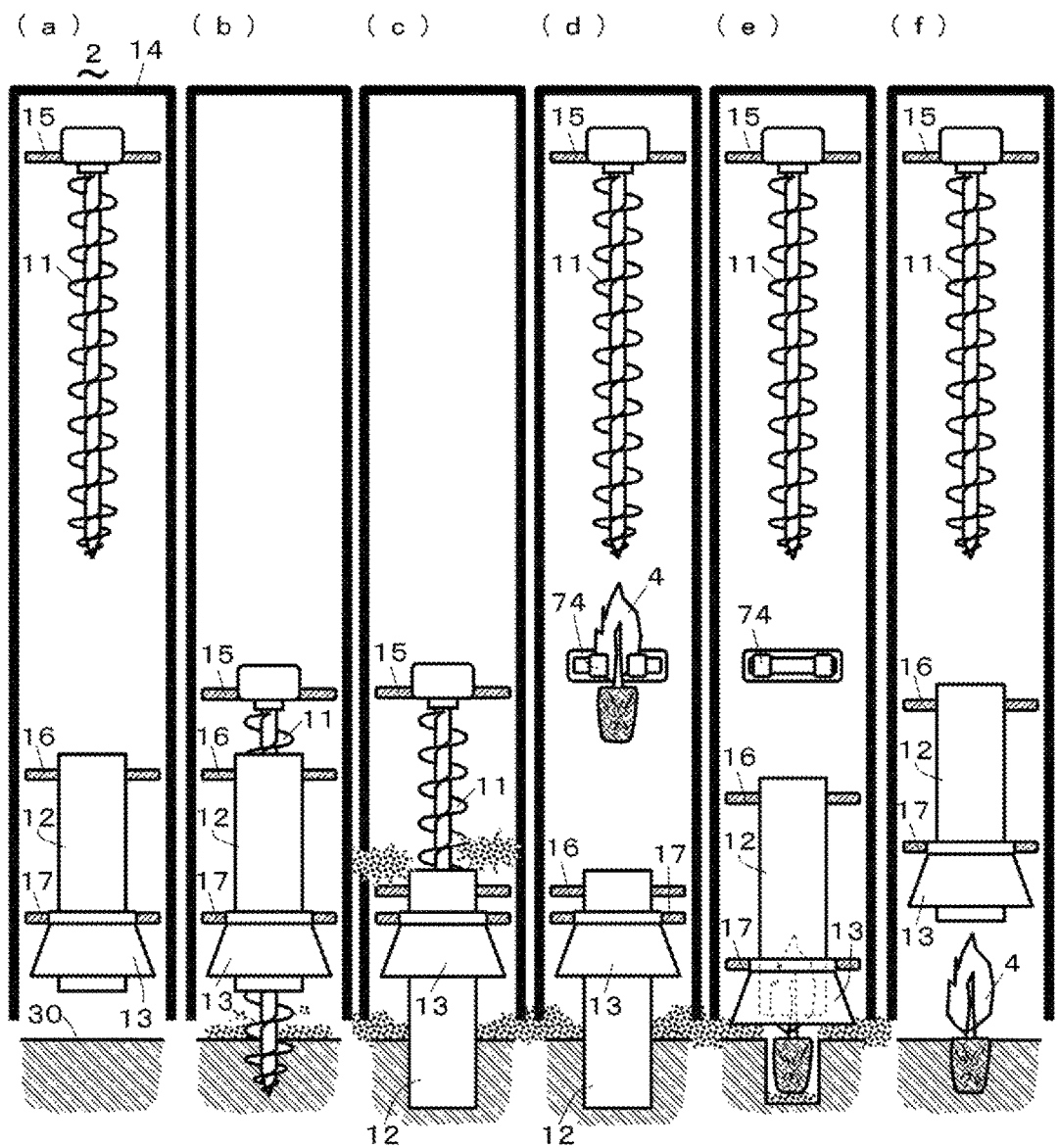
FIG. 10 is a drawing showing motions of the planting apparatus of nursery trees in time-series.

1) When the planting vehicle 1 is traveling, or when the planting operation is not started, the auger 11 is lifted to a stationary position (see FIG. 10(a)).

2) A primary excavation is performed that the rotating auger 11 is moved down by the slider 15 is penetrated through the guide member 12, reaches to the ground, and excavates the ground to a predetermined depth, and excavated soil is discharged to outer periphery of the excavated hole on the ground (see FIG. 10(b)).

3) The guide member 12 is moved down into the excavated hole, and inserted around the outside of the auger 11 (see FIG. 10(c)). Consequently guide 12 is moved down and inserted around the outside of rotating auger 11, in such a state, a secondary excavation is performed. The excavated soil is fed up in the guide member 12 by screw rotation pumping of the auger 11, is discharged from the upper opening of the guide member to the outer periphery of the guide member 12, and slips out on the outer surface of the blade member 13 to the ground.

4) The auger 11 is lifted up to the stationary position and the rotation of the auger 11 is stopped.

5) The robot hand 74 grasping the trunk and branches of the nursery tree 4 is rotated, moved to just above the upper opening of the hollow tube of the guide member 12 and moved down to a predetermined position in vertical direction. Then, when the fork of the robot hand 74 is opened to fall the nursery tree 4 into the hollow tube of the guide member 12, the nursery tree 4 is fallen into the bottom of the guide member 12 and contained into a excavated hole (see FIG. 10(d)).

6) The slider 16 with the guide member 12 is moved up to a position above about several centimeters from the ground 30 and the slider 17 with the blade member 13 is moved down till the bottom of the blade member 13 reaches to the ground. During the downward movement of the slider 17 to the ground 30, the blade member 13 has been rotating to level, to cover and to press the uneven soil (see FIG. 10(e)). By moving down of the blade member 13 with rotation, uneven soil around the nursery tree is made even, so that the gap between the nursery tree and the excavated hole is filled by the soil and the soil is properly pressed.

7) When the value of torque or driving time of the motor 19 for rotating the blade member 13 respectively reach to predetermined values, the downward movement and rotation of the blade member 13 are stopped and leveling, covering and pressing of the soil is stopped.

8) The sliders 16 with the guide member 12 and the slider 17 with the blade member 13 are respectively moved up to standby positions for next planting operation (see FIG. 10(f), and they are returned to the initial state in the above mentioned step 1).

As mentioned above, according to the planting apparatus 2 in accordance with this embodiment, the planting hole is excavated by the auger 11 which penetrates the inner hollow of the guide member 12, the nursery tree 4 is put into the guide member 12 and contained in the excavated hole after pulling off the auger 11, and the blade member 13 is inserted around the outside of the guide member 12 is moved down and rotated under a state that the guide member 12 is lifted up to several centimeters above the ground, so that the soil around the nursery tree 4 is properly leveled, covered and pressed by rotation and pressure. Although, such operations are enabled by manual operation by an operator, when it is comprised of the nested structure of the three-layer of the auger 11, the guide member 12 and the blade member 13 which are moved up and down on the same vertical axis line, it is possible to perform the operations automatically if a control apparatus is comprised to control the driving of the lifting means and rotation means of the planting apparatus 2.

Figure 11:
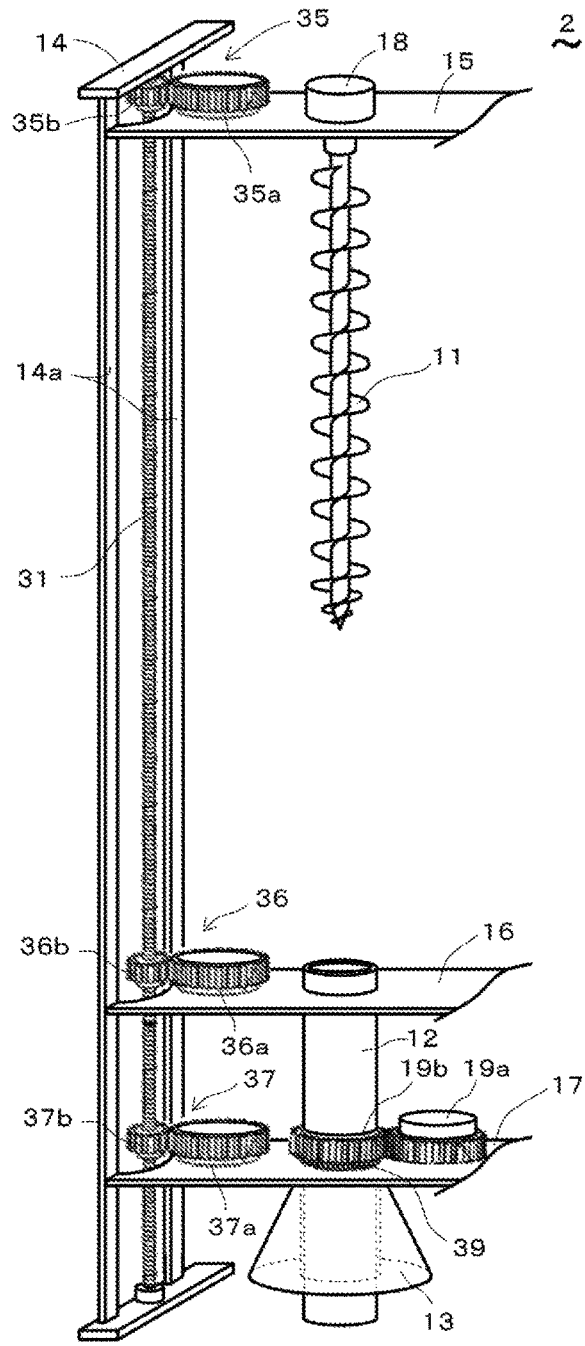
FIG. 11 is a perspective view showing a lifting means and a rotation means and in the planting apparatus of nursery trees.

FIG. 11 shows a specific example of the lifting means and rotation means for moving up and down and rotating the auger 11, the guide member 12 and the blade member 13 mounted on the machine frame 14 (corresponding to the above mentioned first constitutional example). The lifting driving sources 35, 36 and 37 for moving up and down comprise geared motors 35a, 36a and 37a, geared nuts 35b, 36b and 37b which are driven to rotate by these motors and engaged with the ball screw shaft 31. The geared motors 35a, 36a and 37a are respectively fixed on the sliders 15, 16 and 17. When each the geared nuts 35b, 36b and 37b is rotated, a spline driving force is generated between the nut and the ball screw shaft and the driving force is transmitted to each the sliders 15, 16 and 17. The sliders 15, 16 and 17 each has a structure to receive the driving force from the geared nuts 35b, 36b and 37b (details of them are omitted).

The rotation means of the auger 11 is the motor 18, and the rotation means of the blade member 13 is the geared motor 19 and the gear 19b of the blade member 13. The guide member 12 is fixed on the slider 16, and the blade member 13 is rotatably supported on the slider 17 via the bearing 39. According to such a constitution, the rotations of the auger 11 and the blade member 13 can be controlled by controlling the motor 18 and the geared motor 19a preferably. In addition, the up and down movements of the auger 11, the guide member 12 and the blade member 13 can be controlled by controlling the geared motor 35a, 36a and 37a preferably.

Figure 12:
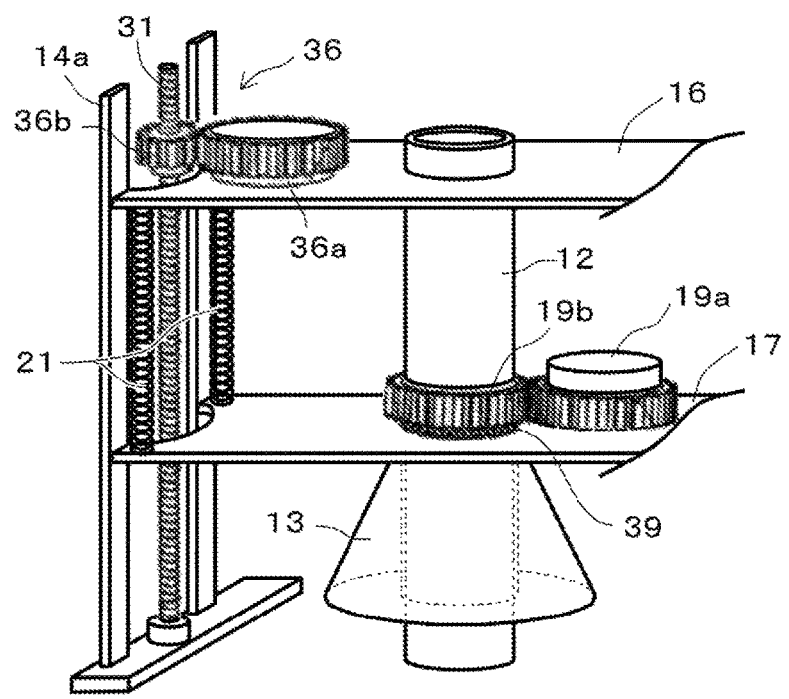
FIG. 12 is a perspective view showing a part of the lifting means and the rotation means according to a modified example.

FIG. 12 shows a modified example of the lifting means of the blade member 13 (corresponding to the above mentioned second constitutional example). In this example, the compression coil springs 21 are used, instead of the lifting driving source 37 (see FIG. 11) for up and down movement of the blade member 13. The compression coil springs 21 are disposed between the slider 16 and the slider 17. Explanation of this motion is omitted because it is described above.

Figure 13:
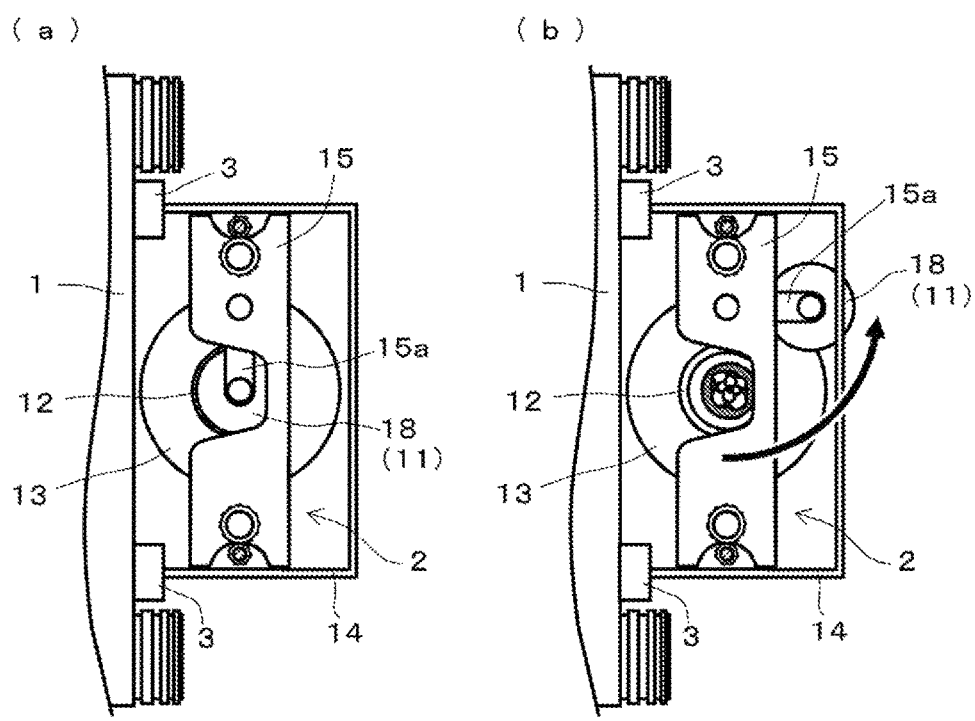
FIG. 13(a) is a plan view showing a situation before retraction of the auger in a modified example of the planting apparatus of nursery trees.
FIG. 13(b) is a plan view showing a situation after retraction of the auger.
Figure 14:
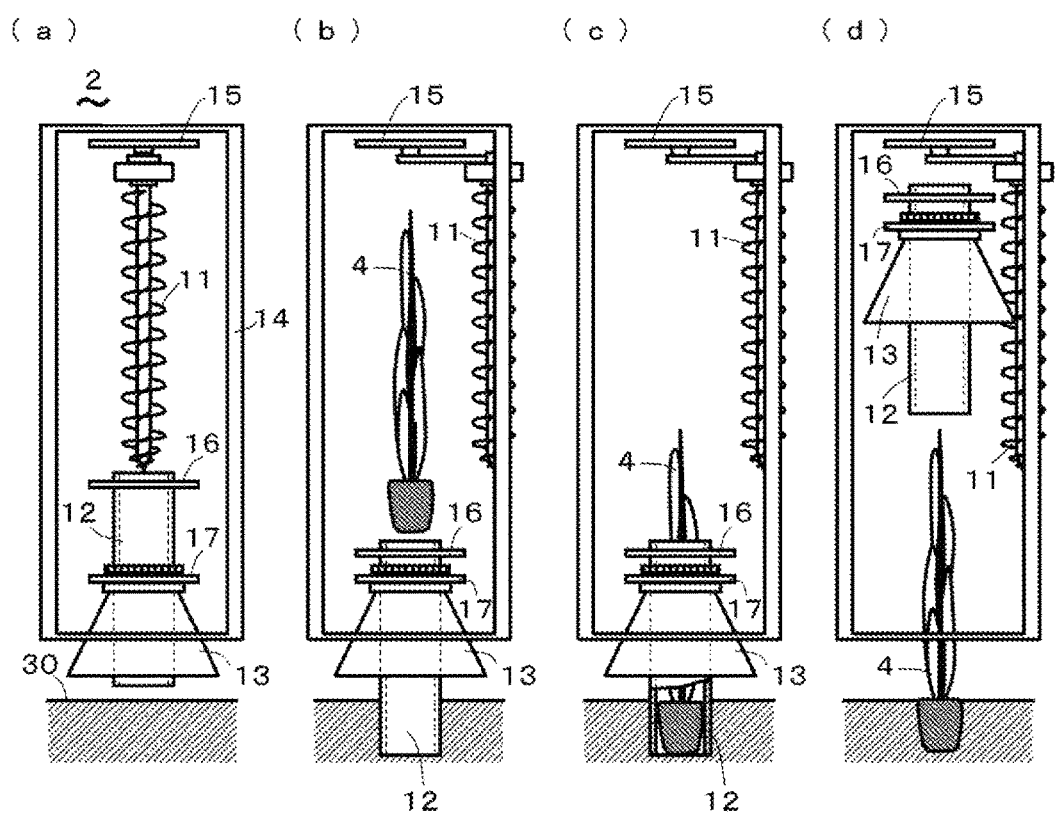
FIG. 14(a) to FIG. 14(d) are drawings showing a planting operation in the modified example of the planting apparatus.

FIGS. 13(a) and 13(b) respectively show a modified example having a refuge function of the auger 11 of the planting apparatus 2. When planting a tall nursery tree or a timber, the lifted auger 11 may lie in the way to put the nursery tree into the guide member 12. In order to prevent such a trouble, this modified example has a structure which enables to refuge the auger 11 from the axis line of the guide member 12. The auger 11 and the motor 18 are supported on the slider 15 via a rotation arm 15a. When planting a nursery tree which is relatively not so tall, the auger 11 is stayed on the axis line of the guide member 12. In contrast, when planting a tall nursery tree or a timber, the rotation arm 15a is rotated so as to refuge the auger 11 from the axis line of the guide member 12. In this modified example, as sequentially shown FIGS. 14(a) to 14(d), the auger 11 refuges out of the axis line of the guide member 12 when a tall nursery tree 4 is put into the guide member 12. Thereby, the auger 11 may not lie on the way when the tall nursery tree 4 is planted.

The present invention is not limited to the above mentioned embodiments and the modified examples of them, and an optional constitution, which enables to form the auger 11, the guide member 12 having a hollow tube shape, and the blade member 13 in the nested structure of the three-layer at least one of which serve as a rotation bearing and the other serve as rotation members and moved up and down on the same vertical axis line direction, is included within the scope of this invention.

EXPLANATION OF THE REFERENTIAL MARKS

1 Planting vehicle of nursery trees
2 Planting apparatus of nursery trees

3 Automatic horizontal maintainer
4 Nursery tree
5 Platform
11 Auger
12 Guide member
13 Blade member
13a Protruded blade
13b Small blade
13c Compression coil spring
13d Cleavage
13e Bottom of the blade member
14 Machine frame
14a Rail
15, 16, 17 Slider (Lifting means)
18, 19, 19a Motor (Rotation means)
19b Rotation gear
21 Compression coil spring
30 Ground
31 Ball screw shaft
35, 36, 37 Lifting driving source
39 Rotation bearing
40 Control apparatus (Control means)
70 Handling robot (Conveying means)
71, 72, 73 Slide rail
74 Robot hand
75 Rotation unit

The invention claimed is:

1. A planting apparatus of nursery trees comprising:
an auger for excavating a planting hole on a ground;
a guide member having a hollow cylindrical tube shape for putting a nursery tree into the excavated planting hole;
a blade member for leveling, covering and pressing soil around the nursery tree which has been put into the excavated planting hole;
a lifting means for moving the auger, the guide member and the blade member up and down in a same vertical axis line direction; and
a rotation means for rotating the auger and the blade member, wherein
the auger, the guide member and the blade member form a nested structure of three layers which are centered upon the auger, and
at least the auger and the blade member are rotation members rotating on the same vertical axis line.

2. The planting apparatus of nursery trees in accordance with claim 1, wherein
the lifting means comprises sliders which respectively support the auger, the guide member and the blade member for moving up and down guided by a machine frame; and
driving sources of the sliders for the auger and the guide member are motors, and a driving source of the slider for the blade member is a motor or compression coil springs provided between the sliders for the guide member and the blade member.

3. The planting apparatus of nursery trees in accordance with claim 1, wherein
the blade member comprises a small blade, which can be moved in and out of a part of the blade member by a compression coil spring as a driving force.

4. The planting apparatus of nursery trees in accordance with claim 1, further comprising a control means to control the lifting means and the rotation means, and wherein
the control means sequentially performs:
a primary excavation to excavate the ground to a predetermined depth by penetrating the auger through inside of the guide member,
a secondary excavation in a state that the guide member is moved down into the excavated planting hole and inserted around the outside of the rotating auger,
moving the auger upward to pull out from the guide member and stopping the auger at a predetermined position,
putting a nursery tree into the guide member from an upper opening thereof,
lifting the guide member from the ground,
moving the rotating blade member downward to the ground to level, to cover and to press soil,
moving the guide member and the blade member upward, and
stopping the guide member and the blade member at a respective predetermined positions, by the lifting means and the rotation means.

5. A planting vehicle of nursery trees comprising the planting apparatus of nursery tree in accordance with claim 1, wherein
the vehicle comprises a platform on which nursery trees are loaded, and a conveying means to convey and to put a nursery tree loaded on the platform to an upper opening of the guide member.

6. The planting apparatus of nursery trees in accordance with claim 2, wherein
the blade member comprises a small blade, which can be moved in and out of a part of the blade member by a compression coil spring as a driving force.

7. The planting apparatus of nursery trees in accordance with claim 2, further comprising a control means to control the lifting means and the rotation means, and wherein
the control means sequentially performs:
a primary excavation to excavate the ground to a predetermined depth by penetrating the auger through inside of the guide member,
a secondary excavation in a state that the guide member is moved down into the excavated planting hole and inserted around the outside of the rotating auger,
moving the auger upward to pull out from the guide member and stopping the auger at a predetermined position,
putting a nursery tree into the guide member from an upper opening thereof,
lifting the guide member from the ground,
moving the rotating blade member downward to the ground to level, to cover and to press soil,
moving the guide member and the blade member upward, and
stopping the guide member and the blade member at a respective predetermined positions, by the lifting means and the rotation means.

8. The planting apparatus of nursery trees in accordance with claim 3, further comprising a control means to control the lifting means and the rotation means, and wherein
the control means sequentially performs:
a primary excavation to excavate the ground to a predetermined depth by penetrating the auger through inside of the guide member,
a secondary excavation in a state that the guide member is moved down into the excavated hole and inserted around the outside of the rotating auger,
moving the auger upward to pull out from the guide member and stopping the auger at a predetermined position, putting a nursery tree into the guide member from an upper opening thereof, lifting the guide member from the ground, moving the rotating blade member downward to the ground to level, to cover and to press soil, moving the guide member and the blade member upward, and stopping the guide member and the blade member at respective predetermined positions, by the lifting means and the rotation means.

9. A planting vehicle of nursery trees comprising the planting apparatus of nursery tree in accordance with claim 2, wherein the vehicle comprises a platform on which nursery trees are loaded, and a conveying means to convey and to put a nursery tree loaded on the platform to an upper opening of the guide member.

10. A planting vehicle of nursery trees comprising the planting apparatus of nursery tree in accordance with claim 3, wherein the vehicle comprises a platform on which nursery trees are loaded, and a conveying means to convey and to put a nursery tree loaded on the platform to an upper opening of the guide member.

* * * * *